Figure 1:
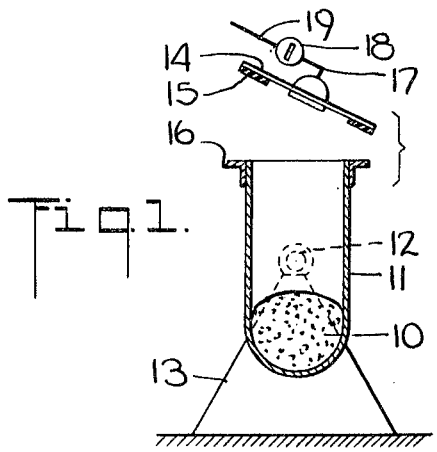

June 27, 1967 R. A. A. JEANNIN ET AL 3,328,203
PROCESS OF FORMING A VISCOUS SUSPENSION OF POWDERED
METAL AND A THICKENING AGENT
Filed Dec. 15, 1964

INVENTOR.
ROBERT ACHILLE ANTOINE JEANNIN
BY HENRI KAGAN

Kenyon & Kenyon
ATTORNEYS 3,328,203
PROCESS OF FORMING A VISCOUS SUSPENSION OF POWDERED METAL AND A THICKENING AGENT
Robert Achille Antoine Jeannin, Paris, and Henri Kagan, Pavillons-sous-Bois, France, assignors to Societe des Accumulateurs Fixes et de Traction (Societe Anonyme), Romainville, France, a company of France
Filed Dec. 15, 1964, Ser. No. 418,510
Claims priority, application France, Dec. 17, 1963, 957,536
6 Claims. (Cl. 136—29)

This invention relates to pastes, and the preparation of pastes, characterized by relative freedom from occluded air bubbles, and more especially relates to pastes containing metal powder which are particularly adapted for use in manufacturing secondary cell electrode carriers made of sintered metal.

A commonly used process for manufacturing such carriers used in a nickel-cadmium alkaline cell consists in coating a thin metal sheet with a paste made of nickel powder, preferably a powder such as is obtained from nickel carbonyl, suspended in a sol or gel containing water and a thickening agent, removing the water contained in the paste by drying, and then sintering the nickel powder.

The coating paste generally contains equal weights of water and nickel powder and a small amount of a thickening agent which is usually carboxymethyl cellulose. In a method often used for preparing such a paste, carboxymethyl cellulose is mechanically stirred in a given amount of water to obtain a sol or gel having a desired viscosity, then the nickel powder is added while stirring goes on until the paste thus formed has attained the desired homogeneity and viscosity.

The foregoing method has several drawbacks. Cellulose derived thickening agents are somewhat difficult to dissolve in water, and tend to form globs or agglomerations upon being added to water, thereby requiring prolonged and rather vigorous stirring in order to achieve a homogeneous solution or sol of the thickener in the water. Additional prolonged stirring then is necessary after the nickel powder is added to assure its dispersion uniformly throughout the resulting suspension or paste.

The prolonged and vigorous stirring has the disadvantage of causing the occlusion of many air bubbles into the paste. Such occlusion causes both a variation in the viscosity of the pastes from batch to batch and also lack of homogenity of the nickel on the electrode carriers after the subsequent sintering step. A variation in the viscosity of the paste would result in a different thickness of the sintered layers. The tendency to occlude air bubbles is a commercially significant disadvantage when carboxymethyl cellulose is used as the thickening agent. Such carboxymethyl cellulose is usually used in the form of its salts, normally its sodium salt. However, the presence of sodium results in disadvantages during the subsequent sintering of the paste, and other cellulose derivatives, such as hydroxyethyl cellulose or methyl cellulose, were tested for use instead of sodium carboxymethyl cellulose. The tendency to occlude air bubbles was so much worse when using such cellulose derivatives as thickeners as to preclude their use in commercial operations. The addition of anti-foam agents, which tend to reduce air-bubble occlusion, is an unsatisfactory remedy because anti-foam agents produce undesirable disadvantages in the sintered metal electrodes.

Furthermore, it is known that the nickel powder obtained from the decomposition of nickel carbonyl, and which is preferably used in making sintered nickel electrodes, has a special microstructure in which the nickel particles agglomerate in spongy, chain-like formations (sometimes characterized as cotton-wool-like flocks; see U.S. Patent No. 2,794,735). Such microstructure results in a low bulk density of the nickel powder, on the order of 0.3 to 1.5 kilograms per liter. However, prolonged and/or vigorous stirring of the paste after the addition of such powder tends to break and fragment the nickel powder chain-like agglomerates.

Thus it has been observed that the prolonged and vigorous stirring heretofore necessary in preparing such pastes has a triple disadvantage: occlusion of air bubbles, leading to increased difficulty in controlling the viscosity of the paste, and less homogeneous and uniform electrodes; fragmentation of the chains of nickel powder; and longer time for preparing each batch of paste.

One of the objects of this invention is to reduce the length of the operations for preparing the paste.

Another object of the invention is to permit the use of various thickening agents, e.g. cellulose derivatives, which dissolve or swell in water with some difficulty.

Another object of the invention is to prevent the occlusion of air bubbles in the paste.

Still another object of the invention is to obtain pastes of a constant viscosity from batch to batch.

A process has now been discovered in which the foregoing disadvantages are avoided or minimized, and whereby a fairly viscous suspension or paste made from a powdered metal and a cellulose-derived thickening agent may be made in less time and with substantially fewer occluded air bubbles and less fragmenting or fracturing of the micro-structure of the powdered metal. In the process, the desired ratio of powdered metal and a comminuted cellulosic thickening agent are dry-mixed to obtain a substantially homogeneous mass in which the metal powder and the thickening agent are uniformly dispersed. Subsequent and more rapid homogeneous dissolution of the thickening agent is promoted by the intimate dispersion of the particles of the thickening agent in the metal powder. This results in less severe stirring being required. All or a portion of the dry mixture is added to a paste-mixing zone, which may be simply a vessel preferably adapted to be sealed against air leakage and to permit a vacuum to be created within it, and the dry mixture in the vessel is preferably degassed (i.e., adsorbed air is removed), by reducing the pressure in the vessel to a low absolute pressure. Then water is added. This addition of water may be made in various ways. In a preferred way advantage is taken of the fact that the powder has been degassed under reduced pressure for boiling lukewarm water at this reduced pressure thereby provoking a thorough but not too rough stirring. An additional stirring may be provided but it need not be prolonged or energetic.

After the paste is mixed to a desired viscosity and homogeneity, it is removed from the vessel by draining or, preferably, by pouring it into the electrode carrier coating apparatus. Care should be taken during the removal of the paste to avoid the occlusion of air bubbles.

A preferred way of carrying the invention into practice is now described.

The weight ratio of the metal (e.g. nickel) powder and thickener may vary, depending upon process variables and more especially upon the desired final viscosity of the paste, but in any event, the dry ingredients should be thoroughly mixed to a homogeneous dispersion. Conventional equipment may be used for the dry mixing. One advantage of the prior mixing of the dry ingredients is that larger batches of them may be prepared and stored, and aliquots used to prepare individual batches of paste. This is an aid to quality control and maintaining uniform characteristics, particularly viscosity, between various batches of paste from the same store.

The dry-mixed ingredients are preferably degassed after being placed in a sealed paste-mixing vessel. This may be done by reducing pressure to a low level, advantageously to a pressure of one or two centimeters of mercury. The reduced pressure is maintained long enough to remove absorbed air from the dry mixture, about five minutes generally being suitable.

After degassing, the water is added, preferably water which itself has been degassed by prior boiling. It is preferred to take advantage of the reduced pressure then existing in the vessel for introducing the water. Such water is at a temperature sufficiently high to assure that it will boil under this reduced pressure. Although with a very low vessel pressure, water at 15° C. might be adequate, i.e. easily brought to the boil, it is preferred that the water be about 25–50° C., or preferably 30–40° C., to assure sufficient boiling and to aid in the rapid dissolution of the thickener. The water quickly wets the premixed ingredients, and the boiling provides stirring action. The amount of water is usually chosen in reference to the amount of metal powder and the ratio of the thickening agent in the dry mixture has been selected with this proportion of water to metal in view. The pressure in the vessel is not substantially increased by the addition of water and the vessel is preferably kept in a closed condition while the stirring operation (by boiling or otherwise) is being conducted. A boiling period in the range of about two to five minutes is usually sufficient, depending upon the composition of the paste and its desired terminal viscosity.

If desired, mechanical stirring or agitating may be used during or after the stirring resulting from the boiling water. Such mechanical stirring may be done with a conventional rotating blade or by gently rotating the mixing vessel.

A specific embodiment of the process is described next in conjunction with FIGURES 1 through 7 of the annexed drawing. FIGURES 1–7 illustrate schematically the equipment that may be used and several of the process steps involved in preparing a batch of paste. One hundred kilograms of nickel powder obtained from the decomposition of nickel carbonyl are dry mixed with 1.5–2.5 kilograms of a powdered high viscosity grade (4000 poises) hydroxyethyl cellulose to form a uniform homogeneous mixture. An aliquot 10 of the dry mixture then is placed in a wide mouth mixing vessel 11, as shown in FIG. 1. Mixing vessel 11 is provided with trunnions 12 and supported by legs 13, and is adapted to receive a cover 14. The cover 14 is provided with a gasket 15 adapted to seal against the flange 16 of the vessel sufficiently tightly to permit maintaining a vacuum in the vessel. The cover 14 is further provided with inlet pipe 17, needle valve 18 and line 19, the latter being adapted for connection to a vacuum pump (not shown) and for immersion into previously degassed water 20 in tank 21 (see FIG. 3).

Figure 2:
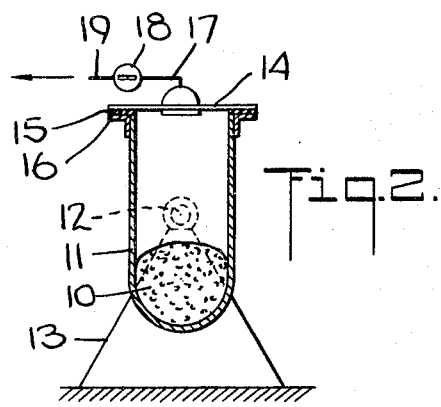

After an aliquot 10 of the dry mixture is placed in vessel 11, the cover 14 is secured to the vessel, line 19 is connected to a vacuum pump, and valve 18 opened (FIG. 2). The pressure within the vessel is reduced to 1.5 cm. of mercury in order to degas the dry mixture 10. The degassing operation only takes about five minutes.

Figure 3:
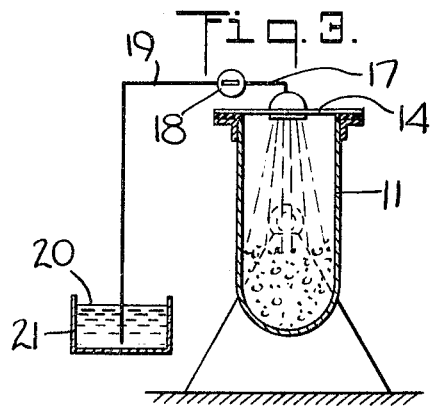

The needle valve 18 is then shut, and the end of line 19 dipped into water 20, which has a temperature of 40° C. Valve 18 is again opened, and an amount of water corresponding to the aliquot 10 (e.g. equal weight) is sucked into vessel 11, as shown in FIG. 3. The amount of water 20 sucked into the vessel may be controlled by adjustment of valve 18, and may be determined by prior calibration of tank 21. Then valve 18 is closed. The water quickly wets the dry mixture 10 and at the same time is brought to a boil on account of the reduced pressure in vessel 11. About two minutes are used for the step shown in FIG. 3.

Figure 4:
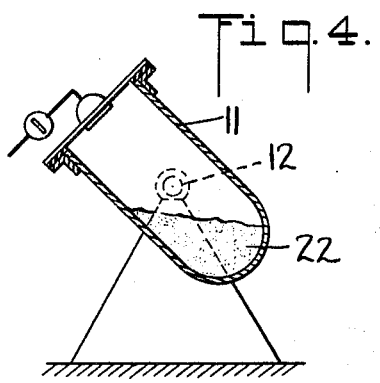
Figure 5:
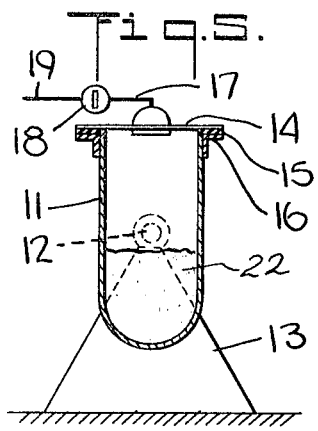
Figure 6:
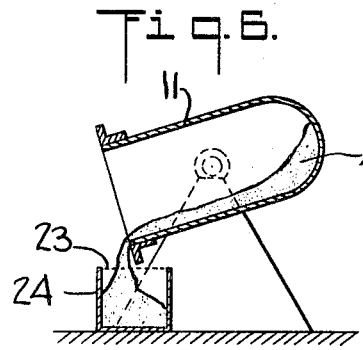

Next, the vessel while still under reduced pressure, is rotated on its trunnions for about 15 minutes, as shown in FIG. 4. This aids in homogenizing the paste. Thereafter, the paste 22 is allowed to lie quietly in the bottom of the vessel for five minutes, while still under reduced pressure (FIG. 5). Then valve 18 is opened, thereby breaking the vacuum (the end of line 19 being open to the atmosphere), the cover is removed, and the finished paste poured through a sieve 23 placed over a coating tank 24 of the electrode sintering apparatus (see FIG. 6). This mode of pouring the paste by tipping the vessel gives a steady flow without risking the inclusion of air bubbles into the paste.

Figure 7:
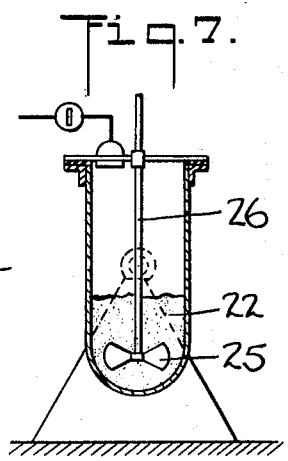

The homogenizing step shown in FIG. 4 optionally may be substituted by mechanical stirring, using a bladed-stirrer 25 carried on a rotated shaft 26, as shown in FIG. 7. Mechanical stirring is sometimes advantageous when the paste 22 has a relatively high viscosity.

Occluded air bubbles are almost entirely absent from the paste so made, the amount of fragmenting of the chains of nickel is reduced, and the total preparation time is less than heretofore necessary. Sintered electrodes made from it have superior homogeneity and more constant thickness.

The mixing vessel 11 should be made of an inert material, have a smooth inside surface, preferably having a wide-mouth cylindrical shape with a hemispheric, or dished, bottom. Optionally, the vessel may be provided with heat transfer means, illustratively by water—or steam—jacketing, to aid is viscosity control and to assure, in cooperation with the regulation of the pressure within the vessel, sufficient boiling of the water.

The process of the invention is applicable to the mixing of any fairly viscous suspension made from small particles or powder of an insoluble solid and a difficultly soluble thickening constituent (not limited to cellulose-derived compounds) adapted to be previously mixed and thereafter formed into a paste by the addition of a liquid which dissolves such thickening constituent. Such liquid need not be water, but may be an organic solvent, such as illustratively, alcohols, ketones or aromatic solvents such as xylene, toluene, etc. Other metals may be used in place of nickel; for instance, silver, copper or iron.

Having thus described the invention, what is claimed is:

1. A process of forming a viscous suspension which comprises dry mixing to a substantially homogeneous mass powdered nickel derived from the decomposition of nickel carbonyl and a thickening agent, reducing the pressure on at least a portion of said mass to sub-atmospheric of from 1–2 cm. of Hg, and while maintaining a sub-atmospheric pressure, adding sufficient water at a temperature of from 15–50° C. which is sufficient to cause its ebullition at said last-named sub-atmospheric pressure to said portion thereby to effect stirring of the mass to form a substantially uniform viscous suspension.

2. A process of forming a viscous suspension which comprises dry mixing to a substantially homogeneous mass a powdered metal and a comminuted thickening agent selected from the class consisting of carboxymethyl cellulose, methyl cellulose, hydroxyethyl cellulose and mixtures thereof, reducing the pressure on at least a portion of said mass to sub-atmospheric of from 1–2 cm. of Hg, and, while maintaining a sub-atmospheric pressure, adding sufficient water at a temperature of from 15–50° C. which is sufficient to cause its ebullition in said mass at said last-named sub-atmospheric pressure to said portion thereby to effect stirring of said mass to form a substantial uniform viscous suspension.

3. A process of forming a viscous suspension which comprises dry mixing to a substantially homogeneous mass a powdered metal, powdered nickel derived from the decomposition of nickel carbonyl and a comminuted thickening agent selected from the class consisting of carboxymethyl cellulose, methyl cellulose, hydroxyethyl cellulose and mixtures thereof, reducing the pressure on at least a portion of said mass to sub-atmospheric of from 1 to 2 cm. of Hg, and, while maintaining a sub-atmospheric pressure, adding sufficient water at a temperature of from 15–50° C. which is sufficient to cause its ebullition in said mass at said last-named sub-atmospheric pressure to said portion thereby to effect stirring of said mass to form a substantially uniform viscous suspension.

4. A process of preparing a paste characterized by relative freedom of gas bubbles which comprises dry mixing to a substantially homogeneous mass powdered nickel and a thickener selected from the class consisting of carboxymethyl cellulose, methyl cellulose, hydroxyethyl cellulose, salts of carboxymethyl cellulose, and mixtures thereof, adding said mass to a paste mixing vessel, degassing said mass by reducing the pressure in said vessel to less than about 0.1 atmosphere, thereafter and while maintaining said vessel at a sub-atmospheric pressure forming a paste by adding liquid water to said mass, said liquid water being at a pressure above the pressure then existing in said vessel and at a temperature of from 15–50° C. which is sufficient to cause a part of said liquid to boil in the mass at said sub-atmospheric pressure, and continuing to maintain ebullition of said water by regulation of the pressure in said vessel, thereby stirring said paste until substantially homogeneous, maintaining said paste substantially free of extraneous gases during the preparation thereof and removing said paste from said vessel.

5. A process of preparing a paste which comprises dry mixing to a substantially homogeneous mass about 100 parts by weight of powdered nickel obtained from the decomposition of nickel carbonyl and about two parts of a high viscosity grade hydroxyethyl cellulose, adding said mass to a mixing vessel, degassing said mass by reducing the pressure in said vessel to less than about 7 centimeters of mercury for a period of about one to five minutes, thereafter and while said vessel is maintained at a sub-atmospheric pressure forming a pourable paste by adding water to said mass in a weight amount slightly greater than the weight of said nickel powder, said water being at an atmospheric pressure and at a temperature of from 15–50° C. in the range of about 25 to about 50° C., whereby at least a part of said water boils in said mass at said sub-atmospheric pressure in said vessel and stirs said paste, further homogenizing said paste by subjecting it to a gentle rotating motion for in the range of about five to about twenty-five minutes, and maintaining said vessel free of air subsequent to said degassing until said paste has reached the desired viscosity and homogeneity.

6. A process of preparing a paste which comprises adding the dry ingredients for a paste to a paste mixing vessel, degassing said ingredients by evacuation to create a sub-atmospheric pressure of from 1–2 cm. of Hg in said vessel, and thereafter while maintaing a sub-atmospheric pressure in said vessel forming a paste by adding a liquid to said vessel, and said liquid being at a pressure above the pressure then existing in said vessel and at a temperature of from 15–50° C. which is sufficient to cause a part of said liquid to boil in the sub-atmospheric pressure within said vessel upon being added to said vessel, thereby stirring said paste.

References Cited
UNITED STATES PATENTS

| | | |
|---|---|---|
| 2,759,446 | 8/1956 | Ewing. |
| 2,978,344 | 4/1961 | Parker et al. _____ 106—193 |
| 3,162,549 | 12/1964 | Jeannin _____ 136—29 X |
| 3,180,760 | 4/1965 | Rauter _____ 136—158 X |

WINSTON A. DOUGLAS, *Primary Examiner.*

ALLEN B. CURTIS, B. J. OHLENDORF, A. SKAPARS, *Assistant Examiners.*